US012661873B2

(12) United States Patent
Uchida

(10) Patent No.: US 12,661,873 B2
(45) Date of Patent: Jun. 23, 2026

(54) GLASS SHEET STRUCTURE BODY AND GLASS SHEET STRUCTURE BODY MANUFACTURING METHOD

(71) Applicant: AGC Inc., Tokyo (JP)

(72) Inventor: Daisuke Uchida, Tokyo (JP)

(73) Assignee: AGC INC., Tokyo (JP)

( * ) Notice: Subject to any disclaimer, the term of this patent is extended or adjusted under 35 U.S.C. 154(b) by 287 days.

(21) Appl. No.: 18/514,360

(22) Filed: Nov. 20, 2023

(65) Prior Publication Data

US 2024/0083145 A1 Mar. 14, 2024

Related U.S. Application Data

(63) Continuation of application No. PCT/JP2022/020446, filed on May 16, 2022.

(30) Foreign Application Priority Data

May 20, 2021 (JP) ................................. 2021-085411

(51) Int. Cl.
*B32B 17/10* (2006.01)
*B32B 1/00* (2024.01)
*B32B 38/00* (2006.01)

(52) U.S. Cl.
CPC .......... *B32B 17/10036* (2013.01); *B32B 1/00* (2013.01); *B32B 17/10321* (2013.01);
(Continued)

(58) Field of Classification Search
CPC ................ B32B 17/10036; B32B 1/00; B32B 17/10321; B32B 17/10568;
(Continued)

(56) References Cited

U.S. PATENT DOCUMENTS 4,969,966 A * 11/1990 Norman .............. C03B 23/0302
156/107
10,809,424 B2 10/2020 Kawai et al.
(Continued)

FOREIGN PATENT DOCUMENTS

CN 110313185 A 10/2019
JP 2009-100223 A 5/2009
(Continued)

OTHER PUBLICATIONS

International Searching Authority, "International Search Report," issued in connection with International Patent Application No. PCT/JP2022/020446, dated Jul. 12, 2022.
(Continued)

*Primary Examiner* — Blaine Copenheaver
(74) *Attorney, Agent, or Firm* — Foley & Lardner LLP

(57) ABSTRACT

A glass sheet composite includes: a first sheet member and a second sheet member; and an intermediate layer between the first sheet member and the second sheet member, in which at least one member selected from the group consisting of the first sheet member and the second sheet member is a glass sheet, each of the first sheet member and the second sheet member is a sheet including a curved surface portion including a convex side main surface protruding in the sheet thickness direction and a concave side main surface opposite to the convex side main surface, the concave side main surface of the first sheet member and the convex side main surface of the second sheet member are overlapped opposite to each other, and the concave side main surface has a radius of curvature smaller than that of the convex side main surface.

19 Claims, 7 Drawing Sheets

(52) U.S. Cl.
CPC .. *B32B 17/10568* (2013.01); *B32B 17/10798*
(2013.01); *B32B 2038/0076* (2013.01); *B32B*
*2250/02* (2013.01); *B32B 2250/40* (2013.01)

(58) Field of Classification Search
CPC ...... B32B 17/10798; B32B 2038/0076; B32B
2250/02; B32B 2250/40; B32B 17/10917;
C03C 27/06; H04R 7/08
See application file for complete search history.

(56) References Cited

U.S. PATENT DOCUMENTS

| | | | |
|---|---|---|---|
| 11,122,370 | B2 | 9/2021 | Akiyama et al. |
| 2013/0251176 | A1 | 9/2013 | Goto et al. |
| 2015/0251377 | A1* | 9/2015 | Cleary .............. B32B 17/10036 |
| | | | 428/172 |
| 2019/0030862 | A1 | 1/2019 | Akiyama |
| 2019/0202173 | A1 | 7/2019 | Fukatani et al. |
| 2019/0217579 | A1 | 7/2019 | Byrne |
| 2019/0387322 | A1 | 12/2019 | Akiyama et al. |
| 2020/0021916 | A1 | 1/2020 | Akiyama et al. |
| 2020/0223187 | A1 | 7/2020 | Sakurai et al. |
| 2020/0230922 | A1 | 7/2020 | Sakurai et al. |
| 2020/0233455 | A1 | 7/2020 | Sakurai et al. |
| 2020/0238665 | A1 | 7/2020 | Sakurai et al. |
| 2020/0404412 | A1 | 12/2020 | Akiyama et al. |
| 2020/0406728 | A1* | 12/2020 | Zhong .................... G02F 1/161 |
| 2021/0314706 | A1 | 10/2021 | Akiyama et al. |
| 2022/0363034 | A1 | 11/2022 | Akiyama et al. |

FOREIGN PATENT DOCUMENTS

| | | |
|---|---|---|
| JP | 2017-190271 A | 10/2017 |
| JP | 2019-527158 A | 9/2019 |
| WO | WO-2017/175682 A1 | 10/2017 |
| WO | WO-2017/179382 A1 | 10/2017 |
| WO | WO-2018/135495 A1 | 7/2018 |

OTHER PUBLICATIONS

International Searching Authority, "Written Opinion," issued in connection with International Patent Application No. PCT/JP2022/020446, dated Jul. 12, 2022.

* cited by examiner

GLASS SHEET STRUCTURE BODY AND GLASS SHEET STRUCTURE BODY MANUFACTURING METHOD

CROSS-REFERENCE TO RELATED APPLICATIONS

This is a bypass continuation of International Patent Application No. PCT/JP2022/020446, filed on May 16, 2022, which claims priority to Japanese Patent Application No. 2021-085411, filed on May 20, 2021. The contents of these applications are hereby incorporated by reference in their entireties.

TECHNICAL FIELD

The present invention relates to a glass sheet composite and a method for manufacturing a glass sheet composite.

BACKGROUND ART

When a (hard and light) material having a high propagation sound speed is used as a diaphragm for a speaker or a microphone, a resonance frequency of a divided vibration of the diaphragm increases, and sound quality with good response can be obtained in a wider band. Therefore, attention has been paid to glass which is a material having a high propagation sound speed as the material of the diaphragm. In addition, although a sound in a high frequency band of 20 kHz or higher is difficult for a human to hear with the ears, a sense of realism can be strongly felt, and therefore, realistic reproducibility is also required for a sound in a high frequency band. As a configuration of a glass sheet that exhibits good acoustic performance also in such a high frequency band, for example, Patent Literature 1 describes a glass sheet composite in which a liquid layer is provided at least between a pair of sheet members.
Patent Literature 1: WO2017/175682

SUMMARY OF INVENTION

When the glass sheet composite described in Patent Literature 1 has a curved surface shape, the sheet member to be overlapped also has a curved surface shape. Therefore, when the sheet members are overlapped with each other, an error in a shape of the glass composite occurs depending on an overlapping direction in which concave surface sides of the curved surface shape are overlapped with each other or a convex surface side and a concave surface side are overlapped with each other. For example, in a case where a convex surface side of one sheet member and a concave surface side of the other sheet member are overlapped opposite to each other, a gap between the sheet members is easily widened at outer edge portions of the sheet members, and a relative position between the sheet members is not stabilized. In addition, breaking or peeling may occur in a sealing member that seals the outer edge portions of the sheet members in some cases.

Assuming air enters a pair of sheet surfaces from the outer edge portions of the glass sheet composite, air bubbles are mixed into the liquid layer, an appearance is significantly impaired, a damping effect caused by the air bubbles occurs, vibrations of the pair of sheet members do not have the same amplitude, and the acoustic performance is deteriorated. In addition, an internal pressure and a size of the air bubble are varied in accordance with an ambient temperature, and the acoustic performance with good reproducibility of the sound is hardly exerted.

Therefore, an object of the present invention is to provide a glass sheet composite and a method for manufacturing a glass sheet composite, in which an error in a shape after a pair of sheet members are overlapped is reduced to prevent air from entering from outer edge portions of the sheet members.

The present invention includes the following configurations.

(1) A glass sheet composite including:
a first sheet member and a second sheet member arranged so as to overlap with each other in a sheet thickness direction; and
an intermediate layer provided between the first sheet member and the second sheet member, in which
at least one member selected from the group consisting of the first sheet member and the second sheet member is a glass sheet,
each of the first sheet member and the second sheet member is a sheet including a curved surface portion including a convex side main surface protruding in the sheet thickness direction and a concave side main surface opposite to the convex side main surface,
the concave side main surface of the first sheet member and the convex side main surface of the second sheet member are overlapped opposite to each other, and
the concave side main surface of the first sheet member has a radius of curvature smaller than a radius of curvature of the convex side main surface of the second sheet member.

(2) A method for manufacturing a glass sheet composite, the glass sheet composite including:
a first sheet member and a second sheet member arranged so as to overlap with each other in a sheet thickness direction; and
an intermediate layer provided between the first sheet member and the second sheet member, in which
at least one member selected from the group consisting of the first sheet member and the second sheet member is a glass sheet,
each of the first sheet member and the second sheet member is a sheet including a curved surface portion including a convex side main surface protruding in the sheet thickness direction and a concave side main surface opposite to the convex side main surface,
the concave side main surface of the first sheet member has a radius of curvature smaller than a radius of curvature of the convex side main surface of the second sheet member,
the method includes:
providing a liquid agent for the intermediate layer and a sealing agent on at least a part of the concave side main surface of the first sheet member;
bonding the convex side main surface of the second sheet member to the concave side main surface provided with the liquid agent for the intermediate layer and the sealing agent to obtain a laminate; and
subjecting the laminate to decompression.

According to the present invention, it is possible to prevent air from entering from outer edge portions of a sheet member, and as a result, to reduce an error in a shape after a pair of sheet members are bonded to each other.

BRIEF DESCRIPTION OF DRAWINGS

FIG. 4 is a contour diagram showing a result of measuring a distribution of a gap between the first sheet member and the second sheet member shown in FIGS. 3A and 3B when the sheet members are bonded to each other.

FIG. 5 is a contour diagram showing a result of measuring a distribution of a gap between the first sheet member and the second sheet member shown in FIGS. 1A and 1B when the sheet members are bonded to each other.

DESCRIPTION OF EMBODIMENTS

Hereinafter, embodiments of the present invention will be described in detail with reference to the drawings.

A glass sheet composite according to the present invention includes a first sheet member and a second sheet member arranged so as to overlap with each other in a sheet thickness direction, and an intermediate layer provided between the first sheet member and the second sheet member. The intermediate layer may include a liquid layer, may be formed of only a liquid layer, and may be formed of only a solid phase. At least one member selected from the group consisting of the first sheet member and the second sheet member is a glass sheet. Each of the first sheet member and the second sheet member is a sheet including a curved surface, and includes a convex side main surface protruding in the sheet thickness direction and a concave side main surface opposite to the convex side main surface. The concave side main surface of the first sheet member and the convex side main surface of the second sheet member are overlapped opposite to each other, and a concave surface and a convex surface of each sheet member overlap with each other. A radius of curvature of the concave side main surface of the first sheet member is smaller than a radius of curvature of the convex side main surface of the second sheet member, and accordingly, a gap at a central portion of the sheet members is thicker than a gap at outer edge portions of the sheet members.

According to the above configuration, the first sheet member and the second sheet member overlap in a state where the gap between the outer edge portions of the sheet members is reduced, and the stability of the sheet members after overlapping can be improved and an error in a shape of the sheet member can be reduced. In addition, a thickness of a sheet surface central portion of the intermediate layer is larger than a thickness of an outer edge portion of the sheet surface, and a gap between the sheet members at the outer edge portions of the sheet members is small. Therefore, air hardly enters the intermediate layer from the outer edge portions of the sheet member. Accordingly, in the glass sheet composite according to the present invention, air bubbles do not remain in the sheet surface, and a film thickness unevenness of the liquid layer in the surface of each sheet member can be reduced.

Hereinafter, a specific configuration example of the glass sheet composite will be described.

Figure 1A:
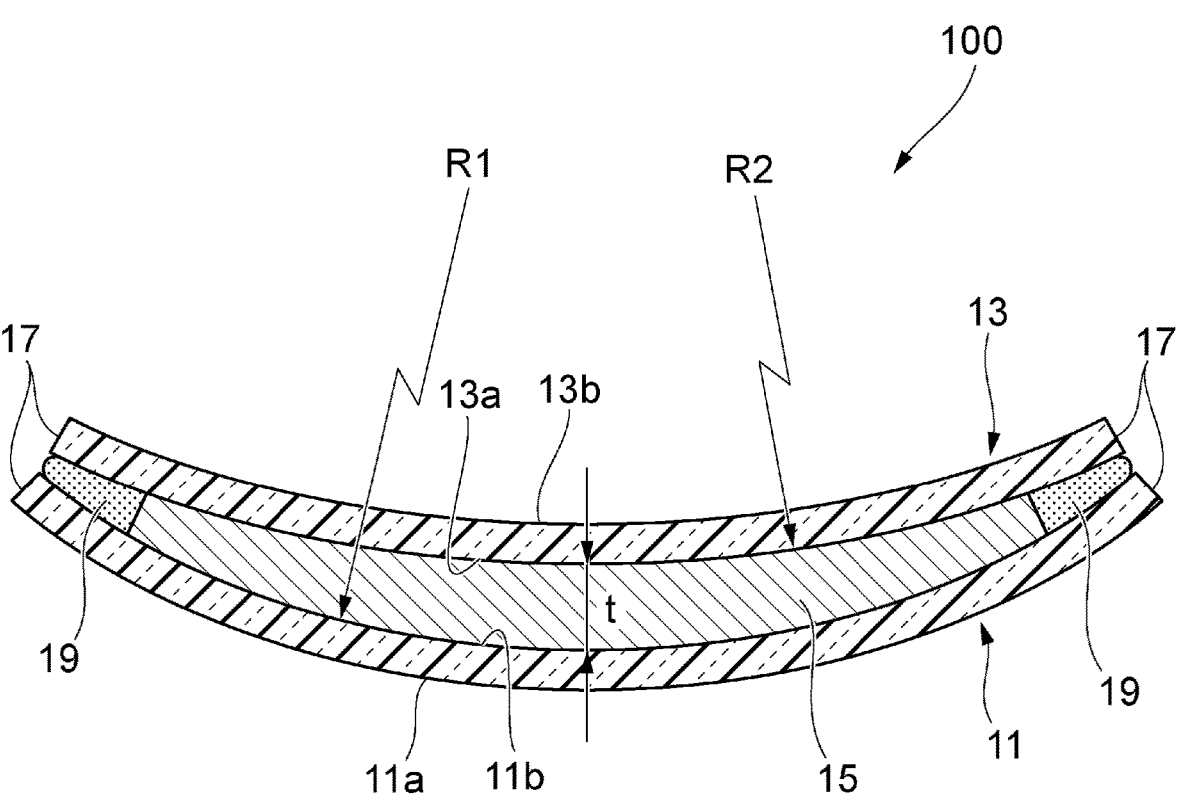
FIG. 1A is a schematic cross-sectional view of a glass sheet composite.

FIG. 1A is a schematic cross-sectional view of a glass sheet composite.

A glass sheet composite 100 includes a first sheet member 11, a second sheet member 13, and an intermediate layer 15 provided between the first sheet member 11 and the second sheet member 13, which are arranged to overlap in a sheet thickness direction. The first sheet member 11 and the second sheet member 13 have the same shape in a planar view. Therefore, outer edge portions 17 of the first sheet member 11 and the second sheet member 13, which are overlapped, are arranged at positions overlapping each other. The first sheet member 11 and the second sheet member 13 may have different shapes in a planar view.

The first sheet member 11 and the second sheet member 13 each have a constant sheet thickness, and include convex side main surfaces 11a and 13a protruding in the sheet thickness direction and concave side main surfaces 11b and 13b opposite to the convex side main surfaces 11a and 13a, respectively. The concave side main surface 11b of the first sheet member 11 and the convex side main surface 13a of the second sheet member 13 are overlapped opposite to each other, and a radius of curvature R1 of the concave side main surface 11b of the first sheet member 11 is smaller than a radius of curvature R2 of the convex side main surface 13a of the second sheet member 13. Accordingly, a distance tin the sheet thickness direction between the first sheet member 11 and second sheet member 13, which are laminated, increases from the outer edge portions 17 toward a central portion of the glass sheet composite 100.

Examples of the "central portion" as referred herein include a portion (region) including the center of gravity of the glass sheet composite 100 in a planar view (viewpoint from a normal direction of a plane) when the glass sheet composite 100 is placed on the plane facing the concave side main surface of the second sheet member 13. The central portion may be, for example, a continuous region in the planar view that includes the center of gravity and has an area of 30% on an inner side with respect to the outer edge portions 17 when an area of the glass sheet composite 100 is defined as 100%. The central portion may be a continuous region of 20%, a continuous region of 10%, or a continuous region of 5% under the above conditions. The glass sheet composite 100 may have a configuration in which the distance tin the sheet thickness direction gradually increases from the outer edge portions 17 toward the central portion of the glass sheet composite 100 in the planar view, or may gradually increase toward the center of gravity.

In addition, a gap between the first sheet member 11 and the second sheet member 13 at the outer edge portions 17 of the sheet members is smaller than a gap between centers of sheet surfaces. The distance between the first sheet member 11 and the second sheet member 13 at the outer edge portions 17 of the sheet members is preferably 0.5 mm or less, more preferably 0.4 mm or less, further preferably 0.3 mm or less, and particularly preferably 0.2 mm or less, over an entire circumference.

Sealing member 19 that joins the first sheet member 11 and the second sheet member 13 to each other are provided at the outer edge portions of the first sheet member 11 and the second sheet member 13, and the intermediate layer 15 is sealed in an internal space surrounded by the sealing member 19.

Figure 1B:
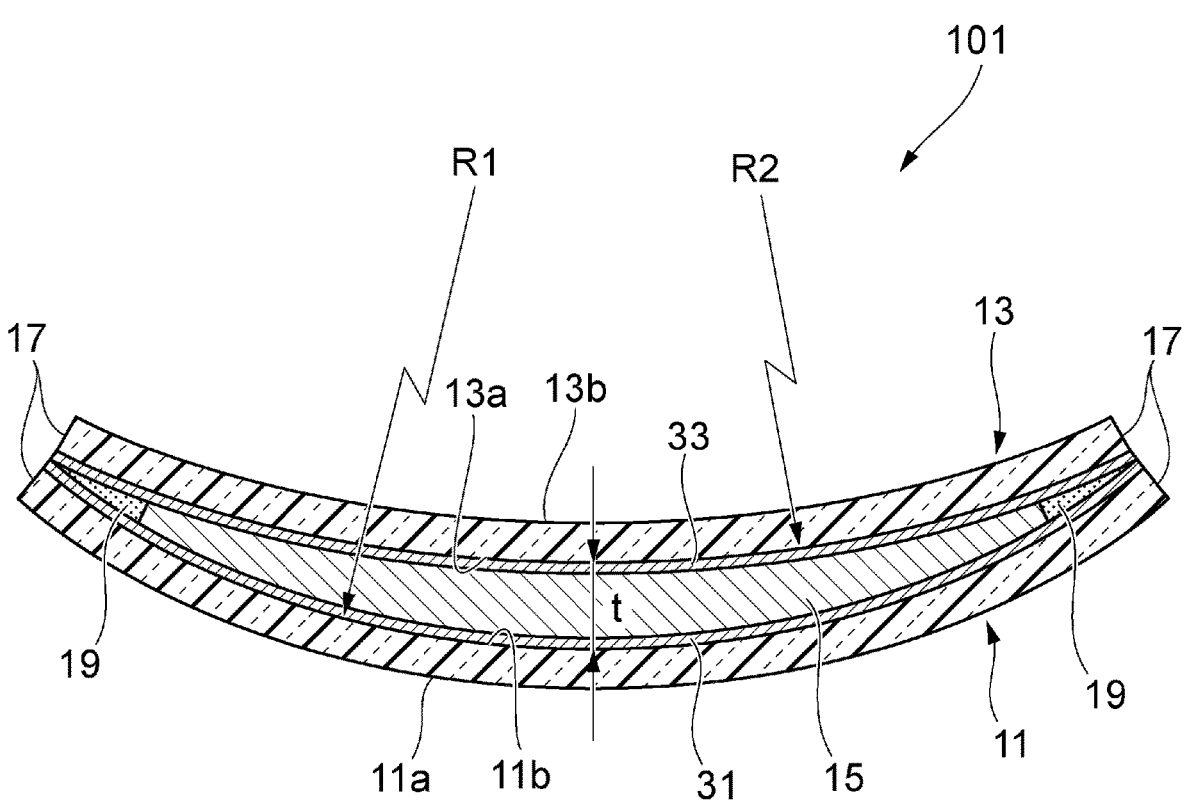
FIG. 1B is a schematic cross-sectional view of another glass sheet composite.

FIG. 1B is a schematic cross-sectional view of another glass sheet composite, the same portions as the glass sheet composite 100 shown in FIG. 1A are given the same numbers, and the description thereof is omitted. A glass sheet composite 101 shown in FIG. 1B includes a first solid layer 31 between the first sheet member 11 and the intermediate layer 15, and a second solid layer 33 between the second sheet member 13 and the intermediate layer 15. The glass sheet composite 101 may include only one of the first solid layer 31 and the second solid layer 33, or may include both. For example, when one of the first sheet member 11 and the second sheet member 13 is a glass sheet, a solid layer may be provided between the glass sheet and the intermediate layer 15. In addition, when the first sheet member 11 and the second sheet member 13 are glass sheets, the first solid layer 31 and the second solid layer 33 are preferably provided.

The first solid layer 31 and the second solid layer 33 may be made of a resin material, a composite material, a fiber material, or a metal material, are not limited to a single layer but may be a plurality of layers, preferably contain a resin material, and may be composed of a resin material. Examples of the resin material include a PMMA resin, a PI resin, a PC resin, a PS resin, a PET resin, a cellulose resin, a PVA resin, and a PVB resin. In addition, the first solid layer 31 and the second solid layer 33 preferably have transparency in a visible light region, and may have a constant thickness. The thickness of each of the first solid layer 31 and the second solid layer 33 may be smaller than that of each of the first sheet member 11 and the second sheet member 13, and for example, may be 2 mm or less, preferably 1 mm or less, and more preferably 800 μm or less. A lower limit value of the thickness of each of the first solid layer 31 and the second solid layer 33 is not particularly limited, but may be, for example, 100 nm or more.

Thus, the glass sheet composite 101 includes at least one of the first solid layer 31 and the second solid layer 33, thereby implementing an effect of preventing scattering when the glass sheet is broken. In particular, when the first sheet member 11 and the second sheet member 13 are glass sheets, an effect of penetration resistance when the glass sheet is broken is easily obtained, which is preferable. The first solid layer 31 may be provided on the entire convex surface of the first sheet member 11, or may be provided on a portion excluding the outer edge portions 17 where the sealing member 19 is provided. Similarly, the second solid layer 33 may be provided on the entire concave surface of the second sheet member 13, or may be provided on a portion excluding the outer edge portions 17 where the sealing member 19 is provided.

FIGS. 2A to 2D are views for explaining a process showing an outline of a procedure for manufacturing a glass sheet composite 100.

Figure 2A:
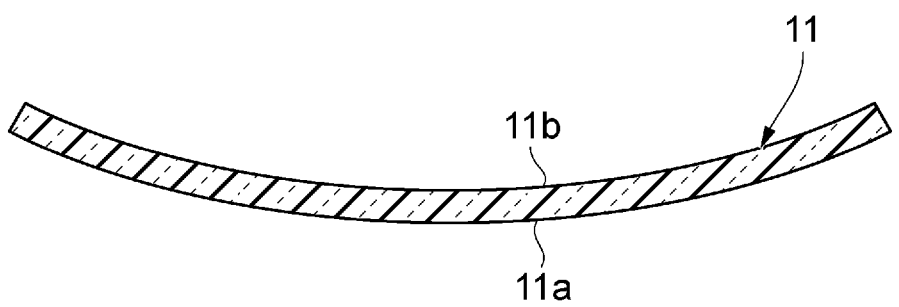
FIG. 2A is a view for explaining a process showing an outline of a procedure for manufacturing a glass sheet composite.
Figure 2B:
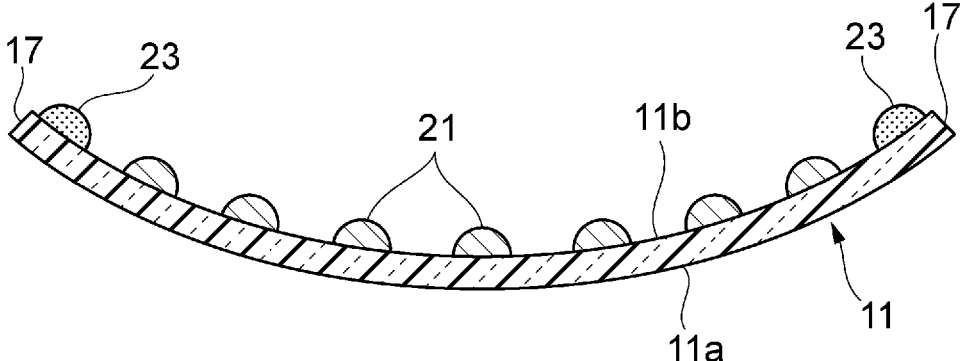
FIG. 2B is a view for explaining a process showing an outline of a procedure for manufacturing a glass sheet composite.

First, as shown in FIG. 2A, in the glass sheet composite 100 configured as described above, the first sheet member 11 is arranged such that the concave side main surface 11*b* faces upward. As shown in FIG. 2B, a liquid agent 21 for the intermediate layer and a sealing agent 23 serving as the intermediate layer 15 are applied to the concave side main surface 11*b*. Here, the sealing agent 23 is applied to the outer edge portions 17 of the concave side main surface 11*b*, and the liquid agent 21 for the intermediate layer is applied to the sheet surface on an inner side with respect to the outer edge portions 17 of the concave side main surface 11*b* to which the sealing agent 23 is applied. The liquid agent 21 for the intermediate layer and the sealing agent 23 may be provided by other methods such as injection and transfer, in addition to application.

When the glass sheet composite 101 including at least one of the first solid layer 31 and the second solid layer 33 is manufactured, the steps of FIGS. 2A to 2D may be performed after at least one of a sheet member in which the first solid layer 31 is bonded to the concave side main surface 11*b* of the first sheet member 11 and a sheet member in which the second solid layer 33 is bonded to the convex side main surface 13*a* of the second sheet member 13 is prepared in advance.

Figure 2C:
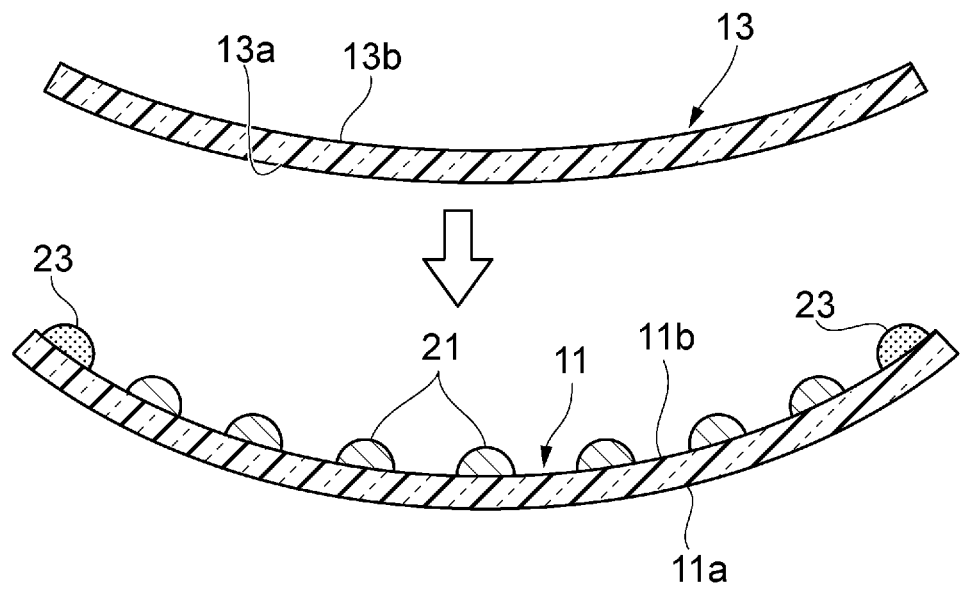
FIG. 2C is a view for explaining a process showing an outline of a procedure for manufacturing a glass sheet composite.
Figure 2D:
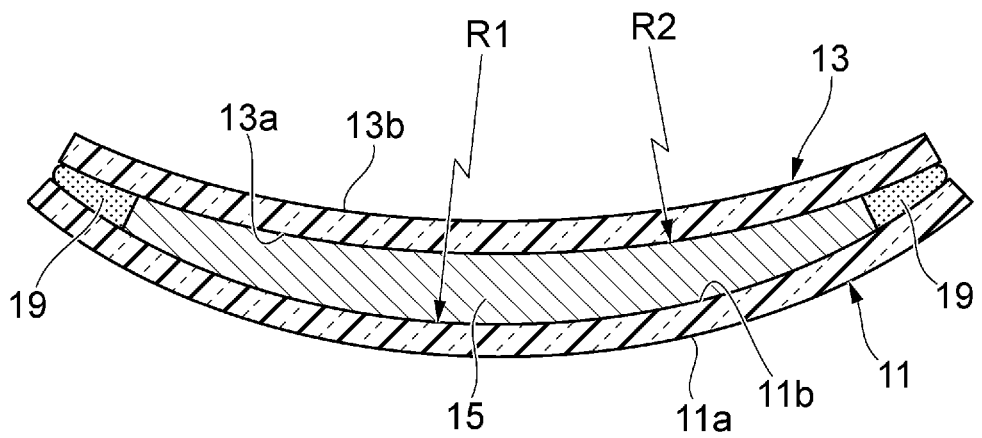
FIG. 2D is a view for explaining a process showing an outline of a procedure for manufacturing a glass sheet composite.

Next, as shown in FIG. 2C, the convex side main surface 13*a* of the second sheet member 13 is arranged to face the concave side main surface 11*b* of the first sheet member 11 to which the liquid agent 21 for the intermediate layer and the sealing agent 23 are applied, and the second sheet member 13 is bonded to the first sheet member 11. Further, a laminate obtained by bonding is subjected to decompression, thereby obtaining the glass sheet composite 100 in which the space between the first sheet member 11 and the second sheet member 13 is filled with the liquid agent 21 for the intermediate layer and the sealing agent 23, as shown in FIG. 2D.

Figure 3A:
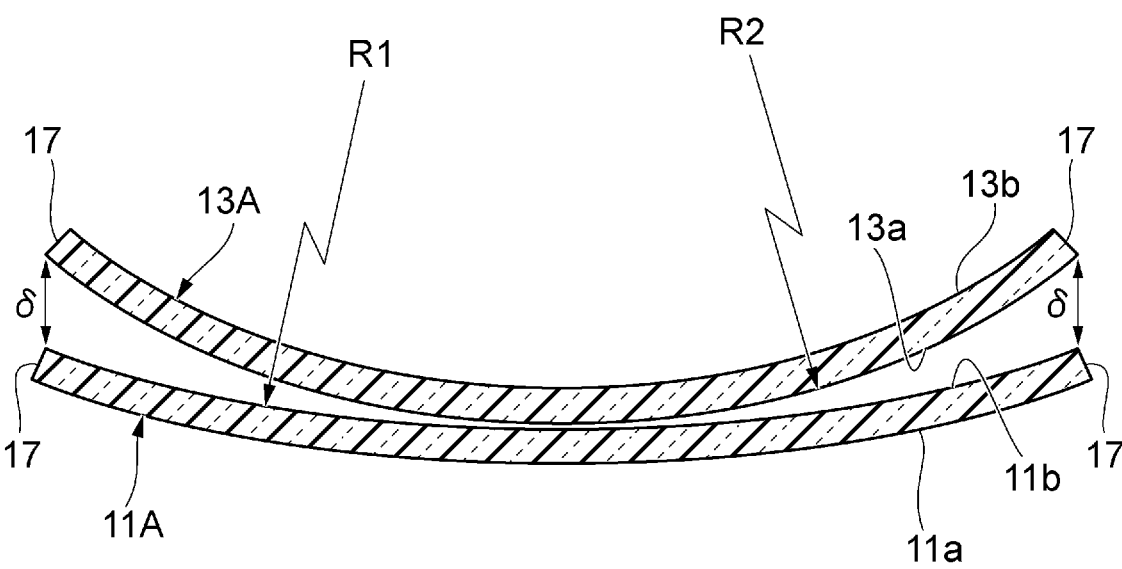
FIG. 3A is a reference view showing another example in which a first sheet member and a second sheet member are overlapped with each other.
Figure 3B:
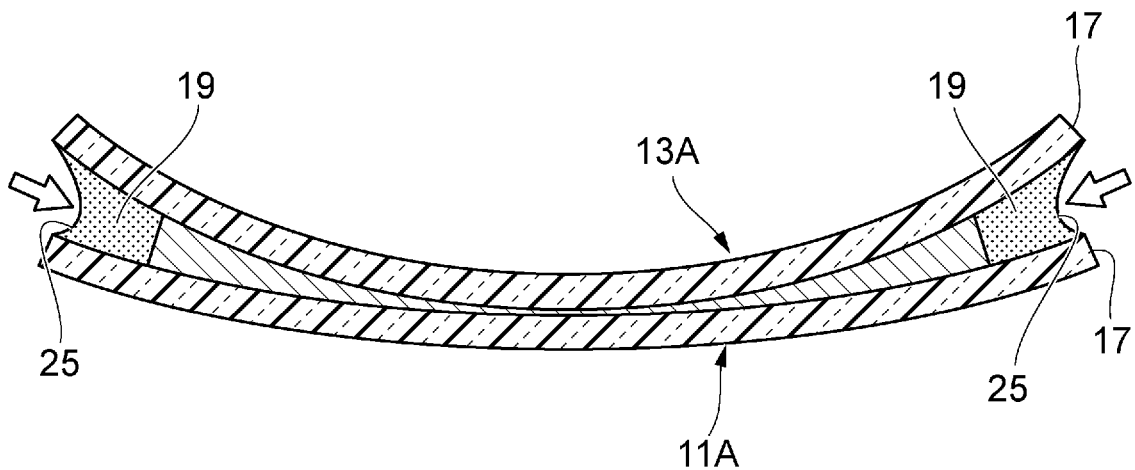
FIG. 3B is a reference view showing another example in which a first sheet member and a second sheet member are overlapped with each other.

FIGS. 3A and 3B are reference diagrams showing another example in which the first sheet member and the second sheet member are overlapped with each other.

A magnitude relation of the radii of curvature of the first sheet member 11A and the second sheet member 13A shown in FIGS. 3A and 3B is reversed, and the radius of curvature R1 of the concave side main surface 11*b* of the first sheet member 11A is larger than the radius of curvature R2 of the convex side main surface 13*a* of the second sheet member 13A. In this case, as shown in FIG. 3A, a central portion of the convex side main surface 13*a* of the second sheet member 13A is closest to the concave side main surface 11*b* of the first sheet member 11A, and gaps δ in the sheet thickness direction are widened at the outer edge portions 17. In this state, a relative position of the first sheet member 11A and the second sheet member 13A is not stable, and a manufacturing variation becomes large at the time of manufacturing a large number of glass sheet composites.

In addition, in a case where the first sheet member 11A and the second sheet member 13A are bonded to each other through the intermediate layer 15 in this state, the sealing member 19 becomes thick at the outer edge portions 17, and recesses 25 are formed toward the center of the sheet surface, as shown in FIG. 3B. The recess 25 may reach the intermediate layer 15 depending on a size thereof, and in that case, air enters the intermediate layer 15, and air bubbles are generated in the intermediate layer 15.

Figure 4:
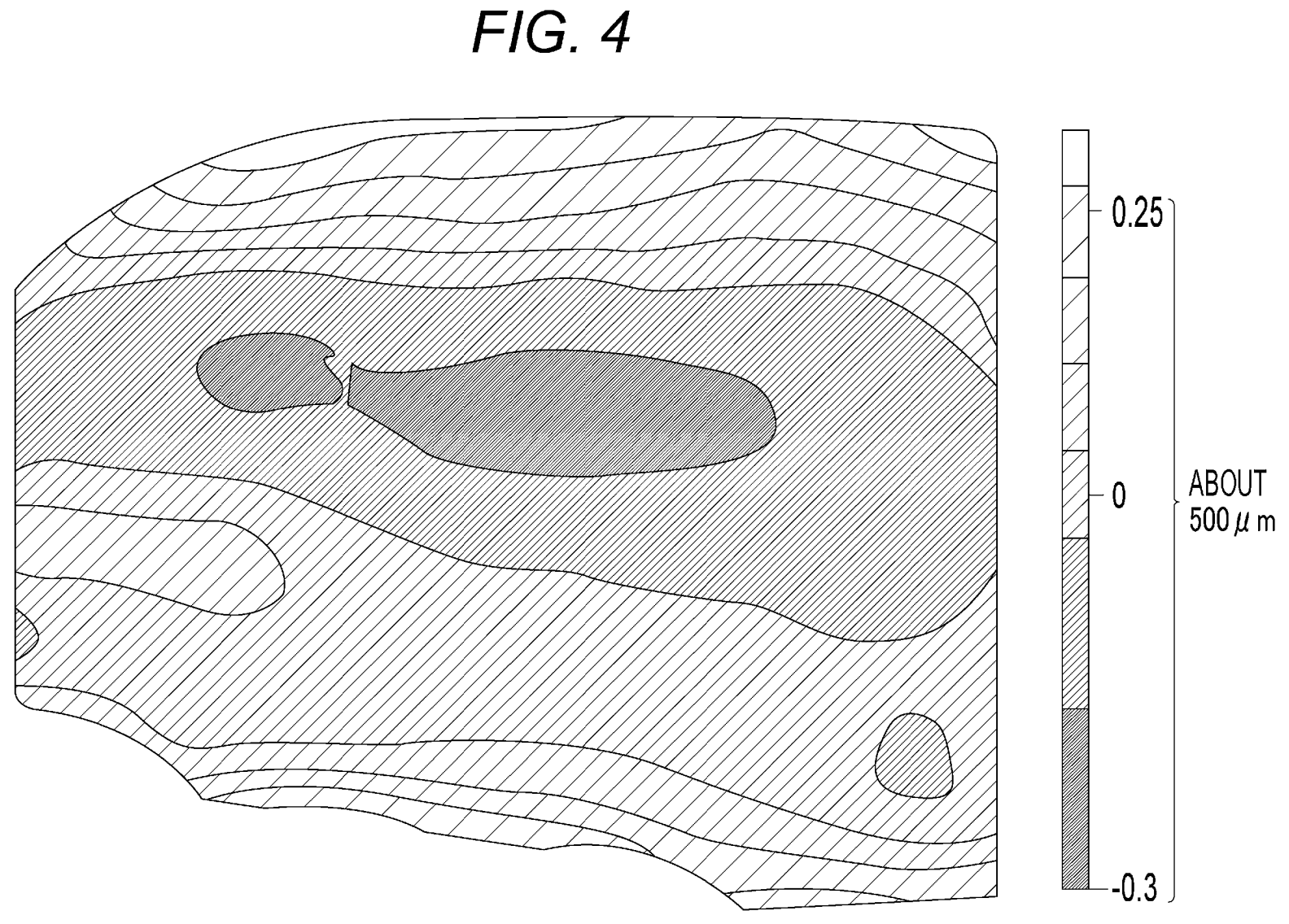

FIG. 4 is a contour diagram showing a result of measuring a distribution of a gap between the first sheet member 11A and the second sheet member 13A shown in FIGS. 3A and 3B when the sheet members are bonded to each other. This gap can be calculated by measuring a height distribution of the concave side main surface 11*b* of the first sheet member 11A, measuring a height distribution of the convex side main surface 13*a* of the second sheet member 13A, and obtaining a difference between heights of the corresponding positions in the sheet surface. The measurement on the height distribution is performed by a fixed point measurement method by a contact-type sensor, a measurement method in a non-contact manner with a laser sensor, and a method by analyzing image data captured from various directions by a plurality of cameras, and an appropriate method is used depending on conditions of an object to be measured.

In the case shown in FIG. 4, the gap at the sheet surface central portion is small, and the gap is increased toward the outer edge portion of the sheet surface. That is, peeling of the sealing member 19 is likely to occur at the outer edge portion of the sheet surface, and air bubbles easily enter the intermediate layer.

A gap generated at the outer edge portions 17 of the first sheet member 11 and the second sheet member 13 is embedded with the applied intermediate layer 15 (liquid agent 21 for the intermediate layer) and the sealing member 19 (hereinafter, also referred to as an application liquid), and the gap is also reduced by deflection occurring between the sheet members. Further, the sealing of the gap is maintained by a viscosity of the application liquid and a viscous friction resistance between the first sheet member and the second sheet member.

The viscous friction resistance of the application liquid between the sheet members increases as a distance from an interface between the application liquid and the sheet member decreases in accordance with the Newton's law of viscosity. For example, in an application liquid having a viscosity of 3 Pa·s, the viscous friction coefficient (apparent viscosity) exponentially increases in a case where the gap becomes 100 μm or less, and becomes an apparent viscosity exceeding 30 times from a case of 100 μm in a case where the gap becomes 10 μm.

In the glass sheet composite 100 of the present configuration, the gap between the first sheet member 11 and the second sheet member 13 at the outer edge portions 17 is assumed to be at least 100 μm or less, preferably 50 μm or less, more preferably 30 μm or less, further preferably 20 μm or less, even more preferably 15 μm or less, particularly preferably 10 μm or less, regardless of the thickness of each sheet member. Therefore, the gap is greatly affected by the influence of the viscous friction resistance between the application liquid and the sheet member at the outer edge portions 17 after air bubbles are discharged from the central portion.

On the other hand, in a case of a reverse combination for the radii of curvature of the first sheet member 11A and the second sheet member 13A as shown in FIGS. 3A and 3B, a gap that occurs when the sheet members are not engaged with each other occur at the outer edge portions 17 of the first sheet member 11A and the second sheet member 13A. The gap widens as the sheet members are deflected in respective opening directions by loading a force to the sheet members. The widening of the gap is compensated by a volume of the application liquid, the viscosity of the application liquid, and the friction resistance, but the application liquid is a viscous body, and the flow of the liquid cannot be stopped even when it is a high-viscosity application liquid. In addition, as the gap widens, a friction resistance value decreases, the flow of the application liquid becomes active, and the deflection of the sheet member cannot be suppressed.

Therefore, the application liquid may have a viscosity sufficient to withstand the deflection of the sheet member, but the viscosity in that case effectively requires several tens of times higher than a normal viscosity. Therefore, the gas cannot pass through the application liquid (sealing member) at the time of discharging the air bubbles, and the air bubbles cannot be discharged.

In addition, when the volume of the application liquid is increased to a state where the sheet member is not deflected, the friction resistance becomes substantially 0 (zero), and the application liquid easily moves. As a result, liquid dripping and a deviation between the sheet members are likely to occur, and a gap occurs at end portions of substrates.

Thus, it is extremely difficult to ensure the sealing of the gap at the outer edge portions 17 in the reverse combination for the radii of curvature, and it is difficult to obtain a glass sheet composite having a good appearance.

On the other hand, in a case of overlapping of the glass sheet composite 100 shown in FIGS. 1A and 1B, the gap becomes small toward the outer edge portions 17 from the center of the sheet member, and the friction resistance of the application liquid becomes maximum at a distal end. Accordingly, the leakage of the application liquid is prevented, the application liquid is not crushed at the time of discharging the air bubbles, and therefore, the air bubbles can be smoothly discharged through the application liquid (sealing member 19).

The sheet thickness of each of the first sheet member 11 and the second sheet member 13 does not greatly affect the above deflection (Young's modulus of material) in a range of 1.8 mm to 3.0 mm.

Figure 5:
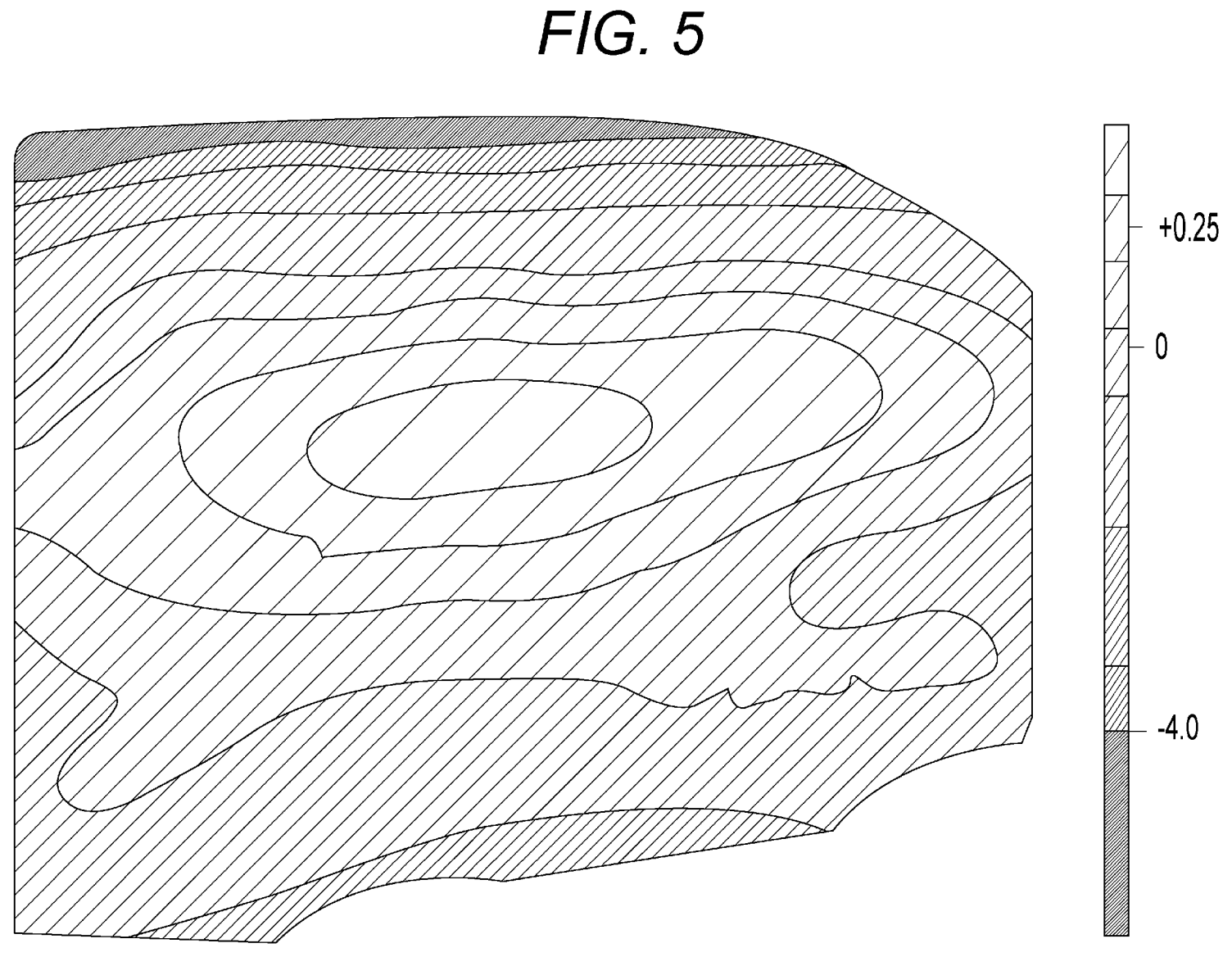

FIG. 5 is a contour diagram showing a result of measuring the distribution of the gap between the first sheet member 11 and the second sheet member 13 shown in FIGS. 1A and 1B when the sheet members are bonded to each other. A method for measuring the gap is the same as in the case of FIG. 4. In a case shown in FIG. 5, the gap at the sheet surface central portion is large, and the gap becomes small toward the outer edge portion of the sheet surface. Therefore, air bubbles are less likely to enter the intermediate layer from the outer edge portion of the sheet surface.

According to the glass sheet composite 100 shown in FIGS. 1A and 1B, in a case where the intermediate layer 15 includes a liquid layer, the surfaces of the first sheet member 11 and the second sheet member 13 are not adhered to each other due to presence of the liquid layer, unlike a case where the pair of sheet members are joined to each other via an adhesive layer, and the vibration characteristics as the sheet members can be maintained. For example, when the first sheet member 11 resonates, the second sheet member 13 does not resonate or a resonance vibration of the second sheet member 13 can be attenuated due to the presence of the intermediate layer (liquid layer) 15, and therefore, the glass sheet composite 100 has a higher loss coefficient as compared with a single sheet member.

Of the first sheet member 11 and the second sheet member 13, one sheet member and the other sheet member preferably have different peak top values of resonance frequency, and more preferably have ranges of the resonance frequency that do not overlap with each other. However, in a case where the ranges of the resonance frequency of the first sheet member 11 and the second sheet member 13 overlap with each other or the value of the peak top is the same, a vibration of one sheet member does not synchronize even when the other sheet member resonates due to the presence of the intermediate layer (liquid layer) 15, and therefore, resonance is canceled out to some extent, and a higher loss coefficient can be obtained as compared with a case of a single sheet member.

That is, it is preferable that a relation of the following Formula 1 be satisfied when a resonance frequency (peak top) and a half-width of resonance amplitude of one sheet member are respectively denoted by $Q_a$ and $w_a$, and a resonance frequency (peak top) and a half-width of resonance amplitude of the other sheet member are respectively denoted by $Q_b$ and $w_b$.

$$(wa+wb)/4 < |Qa-Qb| \qquad \text{Formula 1}$$

As a value on a left side in Formula 1 is larger, a difference in the resonance frequency ($|Qa-Qb|$) between the sheet members is larger, which is preferable since a high loss coefficient can be obtained.

Therefore, it is more preferable to satisfy the following Formula 2, and it is still more preferable to satisfy the following Formula 3.

$$(wa+wb)/2 < |Qa-Qb| \qquad \text{Formula 2}$$

$$(wa+wb)/1 < |Qa-Qb| \qquad \text{Formula 3}$$

The resonance frequency (peak top) and the half-width of resonance amplitude of the sheet can be measured by the same method as that for the loss coefficient in the glass sheet composite.

The first sheet member 11 and the second sheet member 13 preferably have a small mass difference, and more preferably no mass difference. In a case where there is a mass difference between the sheets, resonance of a lighter sheet can be reduced by a heavier sheet, whereas it is difficult to reduce resonance of the heavier sheet by the lighter sheet. That is, in a case where a mass ratio is imbalanced, resonance vibrations cannot theoretically be mutually eliminated because of a difference in inertial force.

A mass ratio of the first sheet member 11 and the second sheet member 13 (first sheet member 11/second sheet member or second sheet member/first sheet member) is preferably 0.8 to 1.25 (8/10 to 10/8), more preferably 0.9 to 1.1 (9/10 to 10/9), and still more preferably 1.0 (10/10).

As the sheet thicknesses of the first sheet member 11 and the second sheet member 13 are both thinner, the sheet members are more likely to adhere to each other via the intermediate layer (liquid layer) 15, and the sheet members can be vibrated with a small amount of energy. Therefore, in an application as a diaphragm for a speaker or the like, the smaller the sheet thickness is, the better it is. Specifically, the sheet thickness of each of the sheet member 11 and the sheet member 13 is preferably 15 mm or less, more preferably 10 mm or less, still more preferably 5 mm or less, even more preferably 3 mm or less, particularly preferably 1.5 mm or less, and especially preferably 0.8 mm or less. On the other hand, in a case where the thickness is extremely small, effects of surface defects on the sheet member tend to be remarkable, breaking tend to occur, and a strengthening treatment is difficult to be performed, and therefore, the sheet thickness of each of the sheet member 11 and the sheet member 13 is preferably 0.01 mm or more, and more preferably 0.05 mm or more.

In an application as an opening member for buildings and vehicles, which suppresses occurrence of an abnormal noise attributed to a resonance phenomenon, the sheet thickness of each of the first sheet member 11 and the second sheet member 13 is preferably 0.5 mm to 15 mm, more preferably 0.8 mm to 10 mm, and still more preferably 1.0 mm to 8 mm.

In an application as a glass substrate for magnetic recording mediums, of which a vibration damping effect is enhanced, the sheet thickness of each of the first sheet member 11 and the second sheet member 13 is preferably 0.3 mm to 1.2 mm, more preferably 0.4 mm to 1.0 mm, and still more preferably 0.5 mm to 0.8 mm.

At least one of the first sheet member 11 and the second sheet member 13 having a larger loss coefficient is preferable for an application as a diaphragm since the vibration damping as a glass sheet composite is also increased. Specifically, the loss coefficient of the sheet member at 25° C. is preferably $1 \times 10^{-4}$ or more, more preferably $3 \times 10^{-4}$ or more, and still more preferably $5 \times 10^{-4}$ or more. An upper limit of the loss coefficient is not particularly limited, but is preferably $5 \times 10^{-3}$ or less from the viewpoint of productivity and manufacturing cost. It is more preferable that both the first sheet member 11 and the second sheet member 13 have the above-described loss coefficient.

At least one of the first sheet member 11 and the second sheet member 13 having a higher longitudinal wave sound speed value in the sheet thickness direction is preferable for an application as a diaphragm since the reproducibility of a sound in a high-frequency region is improved. Specifically, the longitudinal wave sound speed value of the sheet member is preferably $5.5 \times 10^{3}$ m/s or more, more preferably $5.7 \times 10^{3}$ m/s or more, and still more preferably $6.0 \times 10^{3}$ m/s or more. An upper limit thereof is not particularly limited, but is preferably $7.0 \times 10^{3}$ m/s or less from the viewpoint of the productivity of the sheet member and the raw material cost. It is more preferable that both the first sheet member 11 and the second sheet member satisfy the above-described sound speed value.

In the glass sheet composite 100 having the above-described configuration, at least one sheet member of the sheet members including the first sheet member 11 and the second sheet member 13 is formed of a glass sheet. The glass sheet here means an inorganic glass and an organic glass. Examples of the organic glass include a PMMA resin, a PC resin, a PS resin, a PET resin, and a cellulose resin, which are generally well known as transparent resins.

A material of the other sheet member can be any material, and various materials such as a resin plate made of a resin other than the organic glass, a metal plate made of aluminum, and a ceramic plate made of ceramic may be adopted. From the viewpoint of design, workability, and weight, it is preferable to use the organic glass, a resin material, a composite material, a fiber material, or a metal material, and from the viewpoint of vibration characteristics, it is preferable to use the inorganic glass, a high-rigidity composite material or a fiber material, a metal material, or a ceramic material.

As the resin material, it is preferable to use a resin material that can be molded into a flat plate shape or a curved plate shape. As the composite material or the fiber material, it is preferable to use a resin material or a carbon fiber which is compounded with a high-hardness filler, a Kevlar fiber, or the like. As the metal material, aluminum, magnesium, copper, silver, gold, iron, titanium, stainless steel (SUS), or the like is preferable, and other alloy materials and the like may be used as necessary.

As the ceramic material, for example, ceramics such as $Al_2O_3$, SiC, $Si_3N_4$, AlN, mullite, zirconia, yttria, and YAG, and a single crystal material are more preferable. In addition, the ceramic material is particularly preferably a material having a light-transmitting property.

In a case where the inorganic glass is used in the glass sheet constituting at least one sheet member, a composition thereof is not particularly limited, but is preferably, for example, in the following range in terms of mass % based on oxides.

SiO$_2$: 40 mass % to 80 mass %, $Al_2O_3$: 0 mass % to 35 mass %, $B_2O_3$: 0 mass % to 15 mass %, MgO: 0 mass % to 20 mass %, CaO: 0 mass % to 20 mass %, SrO: 0 mass % to 20 mass %, BaO: 0 mass % to 20 mass %, $Li_2O$: 0 mass % to 20 mass %, $Na_2O$: 0 mass % to 25 mass %, $K_2O$: 0 mass % to 20 mass %, $TiO_2$: 0 mass % to 10 mass %, and $ZrO_2$: 0 mass % to 10 mass %. The above composition accounts for 95 mass % or more of the entire glass.

The composition of the inorganic glass sheet is more preferably in the following range.

SiO$_2$: 55 mass % to 75 mass %, Al$_2$O$_3$: 0 mass % to 25 mass %, B$_2$O$_3$: 0 mass % to 12 mass %, MgO: 0 mass % to 20 mass %, CaO: 0 mass % to 20 mass %, SrO: 0 mass % to 20 mass %, BaO: 0 mass % to 20 mass %, Li$_2$O: 0 mass % to 20 mass %, Na$_2$O: 0 mass % to 25 mass %, K$_2$O: 0 mass % to 15 mass %, TiO$_2$: 0 mass % to 5 mass %, and ZrO$_2$: 0 mass % to 5 mass %. The above composition accounts for 95 mass % or more of the entire glass.

As a specific gravity of each of the first sheet member 11 and the second sheet member 13 is smaller, the sheet member can be vibrated with less energy. Specifically, the specific gravity of each of the first sheet member 11 and the second sheet member 13 is preferably 2.8 or less, more preferably 2.6 or less, and still more preferably 2.5 or less. A lower limit thereof is not particularly limited, but is preferably 2.2 or more.

As a specific elastic modulus, which is a value obtained by dividing the Young's modulus of each of the first sheet member 11 and the second sheet member 13 by a density of the sheet members, is larger, the rigidity of the sheet member is increased. Specifically, the specific elastic modulus of each of the first sheet member 11 and the second sheet member 13 is preferably $2.5 \times 10^7$ m$^2$/s$^2$ or more, more preferably $2.8 \times 10^7$ m$^2$/s$^2$ or more, and still more preferably $3.0 \times 10^7$ m$^2$/s$^2$ or more. An upper limit thereof is not particularly limited, but is preferably $4.0 \times 10^7$ m$^2$/s$^2$ or less.

A curved surface shape of each of the first sheet member 11 and the second sheet member 13 may be a single curved surface or may have a plurality of curved surfaces having a plurality of types of radius of curvature. That is, the glass sheet composite 100 may have a multi-curved shape which is curved in both a first direction and a second direction intersecting with each other in a planar view, and may have a single-curved shape which is curved only in the first direction or only in the second direction. Further, one of the first sheet member 11 and the second sheet member 13 may have the multi-curved shape and the other may have the single-curved shape, and a radius of curvature of a concave side main surface of the first sheet member 11 may be smaller than a radius of curvature of a convex side main surface of the second sheet member 13. The first direction and the second direction may be directions orthogonal to each other in the planar view of the glass sheet composite 100.

(Liquid Agent for Intermediate Layer and Sealing Agent)

In the glass sheet composite 100 of the present configuration, the liquid agent 21 for the intermediate layer and the sealing agent 23 are applied to at least a part of a main surface (concave side main surface 11b) of one sheet member (for example, the first sheet member 11) of the pair of sheet members.

The liquid agent 21 for the intermediate layer (hereinafter, also simply referred to as a liquid agent) is a material constituting the intermediate layer 15 of the glass sheet composite 100.

A viscosity coefficient of the liquid agent 21 at 25° C. is preferably $1 \times 10^3$ Pa·s or less from the viewpoint of implementing a high loss coefficient of the glass sheet composite 100. The viscosity coefficient at 25° C. is preferably $1 \times 10^{-4}$ Pa·s or more. In a case where the viscosity is extremely low, vibration is less likely to be transmitted, and in a case where the viscosity is extremely high, a pair of sheet members located on both sides of the intermediate layer 15 are adhered to each other and exhibit a vibration behavior as a single sheet member, and therefore, resonance vibration is less likely to be attenuated. The viscosity coefficient is more preferably $1 \times 10^{-3}$ Pa·s or more, and still more preferably $1 \times 10^{-2}$ Pa·s or more. In addition, the viscosity coefficient is more preferably $1 \times 10^2$ Pa·s or less, and still more preferably $1 \times 10$ Pa·s or less. The viscosity coefficient can be measured by a rotational viscometer or the like.

From the viewpoint of implementing a high loss coefficient of the glass sheet composite 100, a surface tension at 25° C. of the liquid agent 21 is preferably 15 N/m to 80 mN/m. In a case where the surface tension is extremely low, the adhesion between the sheet members decreases, and vibration is less likely to be transmitted. In a case where the surface tension is extremely high, the pair of sheet members located on both sides of the intermediate layer (liquid layer) are likely to adhere to each other and exhibit the vibration behavior as a single sheet member, and therefore, the resonance vibration is less likely to be attenuated. The surface tension is more preferably 20 mN/m or more, and still more preferably 30 mN/m or more. The surface tension can be measured by a ring method or the like.

In a case where the intermediate layer 15 is a liquid layer, the intermediate layer (liquid layer) 15 may evaporate in a case where a vapor pressure is extremely high, and may not function as the glass sheet composite 100. Therefore, the vapor pressure of the liquid agent 21 for the intermediate layer at 25° C. and 1 atm is preferably $1 \times 10^4$ Pa or less, more preferably $5 \times 10^3$ Pa or less, and still more preferably $1 \times 10^3$ Pa or less.

The intermediate layer (liquid layer) 15 is chemically stable, and it is preferable that the intermediate layer (liquid layer) 15 do not react with the first sheet member 11 and the second sheet member 13. The "chemically stable" means, for example, to undergo little degradation (deterioration) by light irradiation or not to cause solidification, vaporization, decomposition, discoloration, chemical reaction with a glass, and the like at least in a temperature region of −20° C. to 70° C.

Specific examples of the liquid agent 21 for the intermediate layer include water, oil, an organic solvent, a liquid polymer, an ionic liquid, and a mixture thereof.

More specifically, examples thereof include propylene glycol, dipropylene glycol, tripropylene glycol, a straight silicone oil (a dimethyl silicone oil, a methylphenyl silicone oil, a methyl hydrogen silicone oil), a modified silicone oil, an acrylic acid polymer, liquid polybutadiene, a glycerin paste, a fluorine solvent, a fluorine resin, acetone, ethanol, xylene, toluene, water, mineral oil, and a mixture thereof. Among them, it is preferable that at least one selected from the group consisting of propylene glycol, a dimethyl silicone oil, a methylphenyl silicone oil, a methyl hydrogen silicone oil, and a modified silicone oil be included, and it is more preferable that propylene glycol or a silicone oil be a main component. In addition, by using the silicone oil as the main component, the intermediate layer (liquid layer) 15 easily dissolves the air, which is preferable because formation of air bubbles can be suppressed.

From the viewpoint of imparting design and functionality such as coloring and fluorescence to the glass sheet composite 100, the liquid agent 21 for the intermediate layer may be a slurry in which powders are dispersed or may contain a fluorescent material.

A content of the powder in the liquid agent 21 for the intermediate layer is preferably 0 vol % to 10 vol %, and more preferably 0 vol % to 5 vol %. From the viewpoint of preventing sedimentation, a particle diameter of the powder is preferably 10 nm to 1 μm, and more preferably 10 nm to 0.5 μm.

The sealing agent 23 is applied in order to prevent leakage of the liquid agent and to prevent peeling of the glass sheet composite at the interface between the sheet and the liquid layer.

The sealing agent 23 is required not to flow out at the time of application to the sheet member and to have a strength capable of withstanding the weight of the sheet members at the time of bonding the sheet members to each other. From such a viewpoint, the viscosity coefficient at 25° C. is preferably $1 \times 10^{-1}$ Pa·s or more, and more preferably 1 Pa·s or more. From the viewpoint of good handleability of application and from the viewpoint of application with a certain leveling property and a narrow seal width, the viscosity coefficient at 25° C. is preferably $1 \times 10^3$ Pa·s or less, and more preferably $1 \times 10^2$ Pa·s or less.

From the viewpoint of efficiently removing air bubbles from the intermediate layer (liquid layer) 15, the viscosity coefficient of the sealing agent 23 is preferably higher than the viscosity coefficient of the liquid agent 21. When air bubbles remaining in the intermediate layer (liquid layer) 15 are excluded in a decompression step to be described later, a flow path through which air bubbles move is easily secured when the viscosity coefficient of the sealing agent 23 is larger than the viscosity coefficient of the liquid agent 21.

Examples of the sealing agent 23 include a high-stretchability rubber, resin, and gel.

As the resin for the sealing agent, an acrylic resin, a cyanoacrylate resin, an epoxy resin, a silicone resin, a urethane resin, a phenolic resin, or the like can be used. Examples of a curing method include a method of one-liquid type curing, two-liquid mixing type curing, heat curing, ultraviolet curing, and visible light curing.

A thermoplastic resin (hot melt bond) can also be used as the sealing agent 23. Examples thereof include an ethylene vinyl acetate resin, a polyolefin resin, a polyamide resin, a synthetic rubber resin, an acrylic resin, and a polyurethane resin.

As the rubber, for example, a natural rubber, a synthetic natural rubber, a butadiene rubber, a styrene butadiene rubber, a butyl rubber, a nitrile rubber, an ethylene propylene rubber, a chloroprene rubber, an acrylic rubber, a chlorosulfonated polyethylene rubber (Hypalon), an urethane rubber, a silicone rubber, a fluororubber, an ethylene vinyl acetate rubber, an epichlorohydrin rubber, a polysulfide rubber (Thiokol), or a hydrogenated nitrile rubber can be used.

An order of the application of the liquid agent 21 and the application of the sealing agent 23 is not limited. The liquid agent 21 may be first applied to a portion where the intermediate layer is to be formed on the concave side main surface 11*b* of the first sheet member 11, and then the sealing agent 23 may be applied so as to surround an outer periphery of the portion. The sealing agent 23 may be first applied to the concave side main surface 11*b* of the first sheet member 11, and then the liquid agent 21 may be applied to an inner periphery thereof.

An application pattern of the liquid agent 21 is not particularly limited, and the liquid agent 21 may be applied in a layer pattern, or may be applied in a dot pattern, a lattice pattern, or a stripe pattern. Among these, a dot pattern is preferable from the viewpoint of easily securing a flow path through which air bubbles escape.

An application thickness of the liquid agent 21 may be appropriately set so that a thickness of the intermediate layer 15 falls within a desired range, and is preferably 5 μm to 500 μm.

The sealing agent 23 is preferably applied so as to surround the outer periphery of the liquid agent 21. In this case, an area of a sealing agent applied portion is preferably 20% or less, more preferably 10% or less, and particularly preferably 5% or less of an area of a liquid agent applied portion so as not to hinder the vibration.

From the viewpoint of easily securing a flow path through which air bubbles escape, an application thickness of the sealing agent 23 is preferably thicker than the application thickness of the liquid agent 21, and is preferably 10 μm to 1,000 μm.

As a method of applying the liquid agent 21 and the sealing agent 23, a known method such as screen printing and a dispenser can be used.

(Laminate Obtained by Bonding Sheet Members)

The second sheet member 13 is bonded to a concave side main surface 11*b* side of the first sheet member 11 to which the liquid agent 21 for the intermediate layer and the sealing agent 23 are applied, thereby obtaining a laminate.

The bonding is preferably performed under a normal pressure. In a decompression bonding method, it is difficult to hold two sheet members with a high positional accuracy in a decompressed state, and it is difficult to laminate the sheet members without positional deviation. However, two sheet members can be laminated with a good positional accuracy by bonding under a normal pressure.

The laminate is preferably not heated in a process of obtaining the laminate by bonding because the sheet member is easily deformed and the sealing agent 23 is softened by heat, making it difficult to secure the flow path through which air bubbles escape and to deform.

(Decompressed Defoaming of Laminate)

The laminate obtained as described above is subjected to decompression. Accordingly, even when air bubbles are present in the intermediate layer (liquid layer) 15 at the time of applying the liquid agent 21 or at the time of bonding the sheet members, air bubbles are slowly moved to the outer edge portion of the sheet member and discharged to the outside of the laminate.

Specifically, the laminate is supplied to an atmosphere of preferably 100 Pa or less, and more preferably 50 Pa or less. A decompression time depends on a defoaming rate, but is preferably 1 minute to 180 minutes.

From the viewpoint of efficiently discharging air bubbles by rapid decompression, the decompression is preferably performed within 30 minutes, more preferably within 15 minutes, and particularly preferably within 10 minutes, until the pressure reaches 100 Pa or less.

Examples of a method for subjecting the laminate to decompression include a method by a decompression chamber, and a method in which the laminate is placed in a bag made of rubber or the like and the inside of the bag is degassed.

At this time, from the viewpoint of rapid decompression, a space volume (L) in a decompression chamber/an exhaust capacity (L/min) in the decompression chamber is preferably 1.8 or less, more preferably 1.5 or less, and still more preferably 0.9 or less.

(Pressurization of Laminate)

The laminate after being subjected to decompression is preferably subjected to pressurization. Accordingly, it is possible to push out, from the intermediate layer (liquid layer) 15, the air that is not completely removed by only the decompression. Examples of a pressurizing method include a method in which the laminate is temporarily compressed using a roll and is compressed using an autoclave. A pressure inside the autoclave is preferably 0.1 MPa to 10 MPa, and a compression time is preferably 1 minute to 30 minutes.

(Curing of Sealing Agent)

The sealing agent 23 may be cured as necessary. Accordingly, it is possible to reliably prevent leakage of the intermediate layer (liquid layer) 15.

A curing means can be appropriately selected according to a material of the sealing agent 23. When the sealing agent 23 is a photocurable resin, curing may be performed by irradiation with light such as ultraviolet, or when the sealing agent 23 is a thermosetting resin, curing may be performed by heating.

(Curing of Intermediate Layer)

The intermediate layer (liquid layer) 15 obtained by the liquid agent 21 for the intermediate layer may be cured as necessary, and it is particularly preferable to perform curing after defoaming because no air remains in the intermediate layer 15 made of a solid phase.

A curing means of the intermediate layer 15 can be appropriately selected according to a material of the sealing agent 23. In addition, a material of the liquid agent for the intermediate layer may be the same as a material of the sealing agent. When the sealing agent 23 is a photocurable resin, curing may be performed by irradiation with light such as ultraviolet light, or when the sealing agent 23 is a thermosetting resin, curing may be performed by heating. In addition, the sealing agent 23 may be a condensation-type resin that depends on moisture.

<Glass Sheet Composite>

The thinner the thickness of the intermediate layer 15 is, the more preferable it is from the viewpoint of maintaining high rigidity and transmitting vibration. From such a viewpoint, when a total thickness of the pair of sheet members is 1 mm or less, the thickness of the intermediate layer 15 is preferably $\frac{1}{10}$ or less, more preferably $\frac{1}{20}$ or less, further preferably $\frac{1}{30}$ or less, still further preferably $\frac{1}{50}$ or less, even more preferably $\frac{1}{70}$ or less, and particularly preferably $\frac{1}{100}$ or less of the total thickness of the pair of sheet members.

When the total thickness of the pair of sheet members exceeds 1 mm, the thickness of the intermediate layer 15 is preferably 100 μm or less, more preferably 50 μm or less, further preferably 30 μm or less, still further preferably 20 μm or less, even more preferably 15 μm or less, and particularly preferably 10 μm or less. A lower limit of the thickness of the intermediate layer 15 is preferably 0.01 μm or more from the viewpoint of film formability and durability.

In addition, it is preferable that at the outer edge portion of the glass sheet composite, the thickness of the sealing agent in a $\frac{1}{3}$ region from the outer edge portion toward the center of the glass sheet composite be 0.5 mm or less in the longitudinal direction of the glass sheet composite. Thus, a strip-shaped sealing member in which the thickness of the sealing agent is 0.5 mm or less is formed, whereby it is possible to reliably prevent the air from flowing into the intermediate layer (liquid layer).

As described above, the present invention is not limited to the embodiments described above, and combinations of the configurations in the embodiments with each other, modifications and applications by those skilled in the art based on the description of the specification and known techniques are also contemplated by the present invention and are included in the scope of protection.

In the above glass sheet composite, the pair of sheet members are bonded to each other with the intermediate layer interposed therebetween, the number of sheet members is optional, and at least one sheet member may be bonded together directly or with an intermediate layer interposed therebetween.

In addition, when the glass sheet composite is provided in a vehicle, examples of an applied portion include a front side window, a rear side window, a front window (windshield), a rear window, and a roof glazing of an automobile. In addition to the automobile, the present invention can also be applied to a railway vehicle or the like, and can also be suitably applied to a diaphragm used in a speaker, a microphone, an earphone, a mobile device, or the like, a window of an aircraft, a window of a ship, a window of a building such as a house (opening member for building), a glass substrate for a magnetic recording medium, or the like, in addition to the vehicle.

As described above, the following matters are disclosed in the present description.

(1) A glass sheet composite including:

a first sheet member and a second sheet member arranged so as to overlap with each other in a sheet thickness direction; and an intermediate layer provided between the first sheet member and the second sheet member, in which at least one member selected from the group consisting of the first sheet member and the second sheet member is a glass sheet, each of the first sheet member and the second sheet member is a sheet including a curved surface portion including a convex side main surface protruding in the sheet thickness direction and a concave side main surface opposite to the convex side main surface, the concave side main surface of the first sheet member and the convex side main surface of the second sheet member are overlapped opposite to each other, and the concave side main surface of the first sheet member has a radius of curvature smaller than a radius of curvature of the convex side main surface of the second sheet member.

According to this glass sheet composite, the concave side main surface of the first sheet member having a small radius of curvature and the convex side main surface of the second sheet member having a large radius of curvature overlap with each other, whereby the first sheet member and the second sheet member can be combined with high accuracy, and the gap of the outer edge portions becomes small. Accordingly, the intermediate layer can be stably sandwiched between the first sheet member and the second sheet member.

(2) The glass sheet composite according to (1), in which a distance between the first sheet member and the second sheet member in the sheet thickness direction is widened from outer edge portions of the first sheet member and the second sheet member toward a central portion of the sheet members.

According to this glass sheet composite, the distance between the first sheet member and the second sheet member in the sheet thickness direction is minimized at the outer edge portion, and the intermediate layer is easily sealed.

(3) The glass sheet composite according to (1) or (2), in which the intermediate layer is a solid phase.

According to this glass sheet composite, the intermediate layer arranged between the first sheet member and the second sheet member is stably sandwiched.

(4) The glass sheet composite according to (1) or (2), in which the intermediate layer includes a liquid layer.

According to this glass sheet composite, good acoustic characteristics are easily exhibited.

(5) The glass sheet composite according to (4), further including a solid layer at least one location selected from the group consisting of between the first sheet member and the liquid layer, and between the second sheet member and the liquid layer.

According to this glass sheet composite, the glass sheet is less likely to scatter when the glass sheet is broken.

(6) The glass sheet composite according to (5), in which the solid layer has a sheet thickness smaller than a sheet thickness of the glass sheet.

According to this glass sheet composite, transparency in a visible light region is easily maintained.

(7) The glass sheet composite according to (5) or (6), in which the solid layer contains a resin material.

According to this glass sheet composite, the glass sheet is less likely to scatter when the glass sheet is broken.

(8) The glass sheet composite according to any one of (4) to (7), in which wherein a sealing member configured to join the first sheet member and the second sheet member to each other is provided at outer edge portions of the first sheet member and the second sheet member, and the liquid layer is sealed in an inner space surrounded by the sealing member.

According to this glass sheet composite, the liquid layer is sealed with the sealing portions, whereby it is possible to prevent entry of air into the liquid layer.

(9) The glass sheet composite according to (8), in which a viscosity coefficient of a sealing agent contained in the sealing member is higher than a viscosity coefficient of the liquid layer.

According to this glass sheet composite, air bubbles can be efficiently removed from the liquid layer.

(10) The glass sheet composite according to (8) or (9), in which the sealing member has a viscosity coefficient of $1\times10^{-1}$ Pa·s or more, and the liquid layer has a viscosity coefficient of $1\times10^3$·s or less.

According to this glass sheet composite, a strength capable of withstanding the weight of the sheet members is obtained at the time of bonding the sheet members to each other.

(11) The glass sheet composite according to any one of (4) to (10), in which the liquid layer is a liquid agent containing silicone.

According to this glass sheet composite, the liquid layer contains silicone so as to easily dissolve air, and formation of air bubbles can be suppressed.

(12) The glass sheet composite according to any one of (1) to (11), in which the first sheet member and the second sheet member have the same shape in a planar view.

According to this glass sheet composite, the outer edge portions of the first sheet member and the second sheet member overlap with each other, and the gap between the sheet members can be reduced.

(13) The glass sheet composite according to any one of (1) to (12), in which a gap between the first sheet member and the second sheet member at outer edge portions of the sheet members is 0.5 mm or less over an entire circumference.

According to this glass sheet composite, it is possible to reliably prevent air from entering the intermediate layer.

(14) The glass sheet composite according to any one of (1) to (13), in which the first sheet member and the second sheet member are both glass sheets.

According to this glass sheet composite, the vibration characteristics can be further improved.

(15) The glass sheet composite according to any one of (1) to (14), in which each of the first sheet member and the second sheet member has a loss coefficient at 25° C. of $1\times10^{-4}$ or more and $5\times10^{-3}$ or less.

According to this glass sheet composite, resonance vibration is attenuated, and good vibration transmission characteristics are obtained.

(16) A method for manufacturing a glass sheet composite, the glass sheet composite including:

a first sheet member and a second sheet member arranged so as to overlap with each other in a sheet thickness direction; and an intermediate layer provided between the first sheet member and the second sheet member, in which at least one member selected from the group consisting of the first sheet member and the second sheet member is a glass sheet, each of the first sheet member and the second sheet member is a sheet including a curved surface portion including a convex side main surface protruding in the sheet thickness direction and a concave side main surface opposite to the convex side main surface, the concave side main surface of the first sheet member has a radius of curvature smaller than a radius of curvature of the convex side main surface of the second sheet member, the method includes:

providing a liquid agent for the intermediate layer and a sealing agent on at least a part of the concave side main surface of the first sheet member;

bonding the convex side main surface of the second sheet member to the concave side main surface provided with the liquid agent for the intermediate layer and the sealing agent to obtain a laminate; and subjecting the laminate to decompression.

According this method for manufacturing a glass sheet composite, the concave side main surface of the first sheet member having a small radius of curvature and the convex side main surface of the second sheet member having a large radius of curvature are bonded via the liquid agent for the intermediate layer and the sealing agent, whereby the first sheet member and the second sheet member can be combined with high accuracy, and further, the gap of the outer edge portions becomes small. Accordingly, the intermediate layer can be stably sandwiched between the first sheet member and the second sheet member.

(17) The method for manufacturing a glass sheet composite according to (16), further including providing a solid layer at least one location selected from the group consisting of between the first sheet member and the liquid agent for the intermediate layer, and between the second sheet member and the liquid agent for the intermediate layer.

According to this method for manufacturing a glass sheet composite, the glass sheet is less likely to scatter when the glass sheet is broken in the manufactured glass sheet composite.

(18) The method for manufacturing a glass sheet composite according to (16) or (17), further including pressurizing the laminate after being subjected to the decompression.

According to this method for manufacturing a glass sheet composite, it is possible to reliably prevent air from entering the intermediate layer.

(19) The method for manufacturing a glass sheet composite according to any one of (16) to (18), further including curing the sealing agent after the sealing agent is provided.

According to this method for manufacturing a glass sheet composite, it is possible to reliably prevent liquid leakage when the intermediate layer includes the liquid layer.

(20) The method for manufacturing a glass sheet composite according to any one of (16) to (19), further including curing the liquid agent for the intermediate layer after the sealing agent is provided.

According to this method for manufacturing a glass sheet composite, the intermediate layer arranged between the first sheet member and the second sheet member is stably sandwiched.

The present application is based on Japanese Patent Application No. 2021-085411 filed on May 20, 2021, the contents of which are incorporated herein by reference.

REFERENCE SIGNS LIST

11: first sheet member
11$a$: convex side main surface
11$b$: concave side main surface
13: second sheet member
13$a$: convex side main surface
13$b$: concave side main surface
15: intermediate layer (liquid layer)
17: outer edge portion
19: sealing member
21: liquid agent for intermediate layer
23: sealing agent
31: first solid layer
33: second solid layer
100 and 101: glass sheet composite

What is claimed is:

1. A glass sheet composite comprising:
a first sheet member and a second sheet member arranged so as to overlap with each other in a sheet thickness direction; and
an intermediate layer provided between the first sheet member and the second sheet member, wherein
at least one member selected from the group consisting of the first sheet member and the second sheet member is a glass sheet,
each of the first sheet member and the second sheet member is a sheet comprising a curved surface portion comprising a convex side main surface protruding in the sheet thickness direction and a concave side main surface opposite to the convex side main surface,
the concave side main surface of the first sheet member and the convex side main surface of the second sheet member are overlapped opposite to each other,
the concave side main surface of the first sheet member has a radius of curvature smaller than a radius of curvature of the convex side main surface of the second sheet member,
the intermediate layer comprises a liquid layer,
a sealing member configured to join the first sheet member and the second sheet member to each other is provided at a gap between the first sheet member and the second sheet member at outer edge portions of the first sheet member and the second sheet member, and
the liquid layer is sealed in an inner space surrounded by the sealing member.

2. The glass sheet composite according to claim 1, wherein a distance between the first sheet member and the second sheet member in the sheet thickness direction is widened from outer edge portions of the first sheet member and the second sheet member toward a central portion of the sheet members.

3. The glass sheet composite according to claim 1, wherein the intermediate layer further comprises a solid phase.

4. The glass sheet composite according to claim 1, further comprising a solid layer provided at least at one location selected from the group consisting of between the first sheet member and the liquid layer, and between the second sheet member and the liquid layer.

5. The glass sheet composite according to claim 4, wherein the solid layer has a sheet thickness smaller than a sheet thickness of the glass sheet.

6. The glass sheet composite according to claim 4, wherein the solid layer comprises a resin material.

7. The glass sheet composite according to claim 1, wherein a viscosity coefficient at 25° C. of a sealing agent contained in the sealing member is higher than a viscosity coefficient at 25° C. of the liquid layer.

8. The glass sheet composite according to claim 1, wherein the sealing member has a viscosity coefficient at 25° C. of $1\times10^{-1}$ Pa·s or more, and the liquid layer has a viscosity coefficient at 25° C. of $1\times10^{3}$ Pa·s or less.

9. The glass sheet composite according to claim 1, wherein the liquid layer is a liquid agent comprising silicone.

10. The glass sheet composite according to claim 1, wherein the first sheet member and the second sheet member have the same shape in a planar view.

11. The glass sheet composite according to claim 1, wherein the gap between the first sheet member and the second sheet member at the outer edge portions of the sheet members is 0.5 mm or less over an entire circumference.

12. The glass sheet composite according to claim 1, wherein the first sheet member and the second sheet member are both glass sheets.

13. The glass sheet composite according to claim 1, wherein each of the first sheet member and the second sheet member has a loss coefficient at 25° C. of $1\times10^{-4}$ or more and $5\times10^{-3}$ or less.

14. The glass sheet composite according to claim 1, being for a vehicle.

15. A method for manufacturing a glass sheet composite, the glass sheet composite comprising:
a first sheet member and a second sheet member arranged so as to overlap with each other in a sheet thickness direction; and
an intermediate layer provided between the first sheet member and the second sheet member, wherein
at least one member selected from the group consisting of the first sheet member and the second sheet member is a glass sheet,
each of the first sheet member and the second sheet member is a sheet comprising a curved surface portion comprising a convex side main surface protruding in the sheet thickness direction and a concave side main surface opposite to the convex side main surface,
the concave side main surface of the first sheet member has a radius of curvature smaller than a radius of curvature of the convex side main surface of the second sheet member,
the intermediate layer comprises a liquid layer,
a sealing member configured to join the first sheet member and the second sheet member to each other is provided at a gap between the first sheet member and the second sheet member at outer edge portions of the first sheet member and the second sheet member, and the liquid layer is sealed in an inner space surrounded by the sealing member, the method comprises:

providing a liquid agent for the intermediate layer and a sealing agent on at least a part of the concave side main surface of the first sheet member;

bonding the convex side main surface of the second sheet member to the concave side main surface provided with the liquid agent for the intermediate layer and the sealing agent to obtain a laminate; and subjecting the laminate to decompression.

16. The method for manufacturing a glass sheet composite according to claim 15, further comprising providing a solid layer at least at one location selected from the group consisting of between the first sheet member and the liquid agent for the intermediate layer, and between the second sheet member and the liquid agent for the intermediate layer.

17. The method for manufacturing a glass sheet composite according to claim 15, further comprising pressurizing the laminate after being subjected to the decompression.

18. The method for manufacturing a glass sheet composite according to claim 15, further comprising curing the sealing agent after the sealing agent is provided.

19. The method for manufacturing a glass sheet composite according to claim 15, further comprising curing the liquid agent for the intermediate layer after the sealing agent is provided.

* * * * *